UNITED STATES PATENT OFFICE.

ADOLF RÖMER, OF STUTTGART, GERMANY, ASSIGNOR TO THE FIRM OF DEUTSCH-KOLONIALE GERB- & FARBSTOFF-GESELLSCHAFT M. B. H., OF KARLSRUHE, GERMANY.

MANUFACTURE OF PRODUCTS ADAPTED TO PRECIPITATE GLUE OR LIKE SUBSTANCES.

1,222,033.   Specification of Letters Patent.   Patented Apr. 10, 1917.

No Drawing.   Application filed July 6, 1914.   Serial No. 849,352.

*To all whom it may concern:*

Be it known that I, ADOLF RÖMER, a subject of the German Emperor, and resident of Stuttgart, Germany, have invented certain new and useful Improvements in the Manufacture of Products Adapted to Precipitate Glue or like Substances, of which the following is a specification.

This invention relates to the manufacture of products capable of precipitating glue and like substances by condensing formaldehyde with a naphthalene sulfonic acid containing a substituent increasing the reactivity of the naphthalene nucleus, *i. e.* a substituent which for instance enables a reaction of diazo-compounds on the naphthalene nucleus to take place, in particular with α or β naphthol-sulfonic acids or with α and β naphthyl amin sulfonic acids or their salts.

The manufacture of condensation products, by the interaction of naphthol-sulfonic acids and formalin, in the presence of concentrated sulfuric acid, is already known; in this reaction the presence of sulfuric acid is essential for the formation of the condensation products, since it takes part in the reaction.

Further it is well known that by heating 1-oxynaphthalene-3-sulfonic acid, or derivatives thereof, with formaldehyde in an alkaline solution there are obtained characteristic colored products possessing the properties of vat dyestuffs.

The surprising fact has now been discovered that substances, entirely different from the well known condensation products are obtained, by condensing one molecule of formaldehyde (or the corresponding quantity of a substance from which formaldehyde can be split off) with two molecules of 1- or 2-oxynaphthalene-monosulfonic acid in either aqueous or silghtly acid solution, that is, a non-alkaline solution containing a large proportion of water; this reaction is preferably carried out at the ordinary temperature, care being taken to avoid high temperatures. As the reaction takes place quite easily in aqueous solution, the use of a special condensing agent is unnecessary. When working in a weak acid solution, hydrochloric acid is preferably employed; other acids, however such as acetic acid, or acid salts could be used. If sulfuric acid be employed, it must be very dilute, as otherwise there is danger of its taking part in the reaction.

In carrying out the process, the work is preferably carried on at the ordinary temperature, for at an elevated temperature there are produced in addition to the main product, dark colored more easily soluble products, the formation of which must be attributed to the greater extent to which condensation with formaldehyde proceeds.

In the following examples there will now be described methods of manufacturing products according to this invention.

*Example 1.*

5 parts by weight, for instance of 2-oxy-naphthalene-6-monosulfonic acid are dissolved in 15–20 parts by weight of water. To the cold solution 0.85 parts by weight of formaldehyde (40%) are added and the mixture is left to stand for a few hours, during which time it is preferably stirred. After some time, well formed lamellar crystals separate out. When the formaldehyde smell has completely, or almost completely, disappeared, the mixture is acidified with hydrochloric acid, whereupon it immediately solidifies to a thick crystalline paste. After re-crystallizing once, the new compound is obtained in a pure white or practically colorless condition. It is in the form of the free acid soluble in less than 10 parts of water, but nevertheless more difficultly soluble than the raw material.

This compound also combines with diazo compounds. With a very dilute solution of ferric chlorid, a slightly blue coloration is formed. The most characteristic behavior of the new product is shown with concentrated sulfuric acid. If the substance either after drying in air, or in the form of the moist paste, is brought into contact with cold concentrated sulfuric acid, a very striking yellowish green fluorescence at once appears, and on dilution with water, a new orange-red substance in the crystalline condition is precipitated. This new substance shows a splendid fluorescence in very dilute aqueous solution, a rose red in refracted and green in reflected light. When dry, the substance has an intense golden glitter. This reaction product is easily soluble in alkalis, but no longer shows any fluorescence in alkaline solution. In place of formaldehyde, there could also be employed corresponding quantities of substances which split off formaldehyde, such for instance as trioxymethylene or methylal. In the same manner as from the 2-oxynaphthalene-6-monosulfonic acid, it is also possible to obtain from the 2:7-acid with formaldehyde a hitherto unknown condensation product which is more difficultly soluble than the raw material, and which is precipitated from its concentrated solution by hydrochloric acid in the form of a silvery looking crystalline precipitate. The product couples with diazo compounds and also forms a fluorescent compound by the action of concentrated sulfuric acid; the fluorescence of the compound is however not as good, both as regards appearance and intensity, as that of the product obtained from the isomeric acid. With a very dilute solution of ferric chlorid, the new compound gives a pale bluish-green coloration.

The 1-oxynaphthalene monosulfonic acids can be condensed with formaldehyde in accordance with the same process.

*Example 2.*

5 parts by weight of 1-oxynaphthalene-4-monosulfonic acid, are dissolved in 20 parts by weight of water. To the cold solution are added 0.33 parts by weight of trioxymethylene dissolved in water, the whole is stirred for a considerable time, and then the new compound is precipitated by means of concentrated hydrochloric acid in the form of a gray-crystalline precipitate; the whole is filtered and washed with a small amount of a solution of sodium chlorid. Owing to its tendency to oxidize, the compound is not very stable in the free state, but on being brought into contact, in concentrated solution, with a concentrated solution of bisulfite, it forms a stable product in the bisulfite compound, which separates from the concentrated solution in the form of a white crystalline precipitate. When mixed with ferric chlorid, aqueous solution of the condensation product becomes of a blue color.

The 1-oxynaphthalene-5-monosulfonic acid derivative, after condensation, separates on the addition of hydrochloric acid, in the form of a bright gray crystalline precipitate which is easily soluble in water. The solution of the new substance, on being mixed with ferric chlorid first shows a bluish-green coloration, and on being left to stand, a white precipitate separates. The condensation product from 1-oxynaphthalene-5-sulfonic acid also has the tendency to oxidize, but this tendency can be stopped by the addition of small quantities of sulfurous acid.

It has been further found that products possessing good glue-precipitating properties can also be obtained by increasing the quantity of the formaldehyde employed. If, for instance, for one molecule of the sulfonic acid there is used one molecule of formaldehyde (that is to say, twice as much as in the preceding examples) and if the remainder of the process is carried out in accordance with the instructions previously given, other condensation products will be obtained which differ from those previously obtained by having a greater solubility and in their darker color. In that case, the reaction is assisted by heating.

*Example 3.*

5 parts by weight of 2-oxynaphthalene-6-monosulfonic acid are dissolved in 15–20 parts by weight of water, heated to 60° and mixed with 0.5 part by weight of hydrochloric acid of 22° Bé. To this solution there is added 1.7 parts by weight of formaldehyde (40%). The whole is allowed to cool gradually for several hours, during which time it is stirred, and the condensation product is then precipitated by means of concentrated hydrochloric acid or sodium chlorid.

The new condensation products of the α and β naphthol-sulfonic acids with formaldehyde, obtained according to this invention, are characterized by their acidified solutions possessing glue-precipitating properties to a high degree.

The salts of naphthol-sulfonic acids also condense, although perhaps not quite so well, with formaldehyde.

A modification of the process described consists in using, in place of the oxynaphthalene-sulfonic acids, amino naphthalene sulfonic acids particularly the heteronuclear 1- or 2-aminonaphthalene-monosulfonic acids or their salts.

If, for instance, one molecule of formaldehyde is caused to react with two molecules of a heteronucleal sulfonic acid of α- or β naphthylamin in aqueous, or slightly acid, solution at the ordinary temperature, condensation products will also be obtained in this case, which, in the presence of acids, precipitate glue from its solutions and can convert animal skin into leather.

Several processes for manufacturing condensation products from amino-naphthalene-sulfonic acids and formaldehyde are already well known, but they all differ substantially from the present process and give entirely different products. It has, for instance, been suggested to cause to react together simultaneously 2-amino-naphthalene 3.6-disulfonic acid, formaldehyde and sulfuric acid, so that not only the formaldehyde but the sulfuric acid as well enters into the reaction with the sulfonic acid, extensive conversions taking place. It has been further suggested to convert the sodium salt of 1-aminonaphthalene-2-monosulfonic acid in boiling aqueous solution, in the presence of hydrochloric acid, by means of formaldehyde, into 1.1-diamino-4.4-dinaphthyl methane-2.2-.-disulfonic acid. According to another process, acridine derivatives of naphthalene are obtained, ammonia being split off.

Finally, it has been suggested to combine 1-amino-naphthalene-3-monosulfonic acid (or its derivatives) in acid solution and under the action of heat, with a large quantity of formaldehyde, so as to form clearly characterized dyestuffs. All these processes relate to such aminonaphthalene-sulfonic acids which contain the amino group and at least one sulfonic acid group in the same nucleus.

In view of the above it is surprising that by treating hetero-nuclear sulfonic acids of α- or β-naphthyl-amin with formaldehyde in aqueous solution at the ordinary temperature in accordance with the present invention, condensation products are obtained, completely different from those obtained by the well known methods. More particularly, it is worthy of mention that in the present process, no acridine derivatives are formed, in spite of the unoccupied ortho position relatively to the amino group, a result which is contrary to the old assumption.

*Example 4.*

5 parts by weight of 1-aminonaphthalene-6-monosulfonic acid are dissolved, with the addition of the quantity of anhydrous sodium carbonate required for forming the sodium salt, namely 1.2 parts by weight in 30 parts by weight of water. A mixture of 0.84 part by weight of formaldehyde (40%) and a quantity of 13.8 parts by weight of acetic acid (10%) equivalent to the quantity of the sodium carbonate used is slowly introduced into the cold solution of this sodium salt. The addition is preferably regulated so as to avoid having present an excess of acetic acid, in order to avoid precipitation of the free sulfonic acid and so that the process of condensation should proceed according as the addition of the formaldehyde-acetic acid mixture is made. To effect this ½-3 hours are required. The completion of the reaction which takes place soon after the addition of the formaldehyde, is recognized by the fact that a sample on acidification with dilute hydrochloric acid and dilution with water, no longer precipitates any free 1-amino-naphthalene-6-sulfonic acid. For the purpose of separating the condensation product thus formed, the solution is mixed with an excess of strong hydrochloric acid, when the new compound separates in the form of a grayish-white amorphous precipitate, which can be separated still more completely by the addition of solid sodium-chlorid. The new compound is easily soluble in water, and a dilute solution gives a blue coloration with ferric chlorid.

Instead of acetic acid, there could also be employed corresponding quantities of other acids, preferably however in such manner that no precipitation of free amino-naphthalene-sulfonic acids takes place. Moreover, the free amino-naphthalene-sulfonic acids could also be replaced by their normal salts, for instance sodium salts, in which case the addition of soda, mentioned in the example, is of course omitted. The formaldehyde can be replaced by corresponding quantities of other active methylene-containing substances, for instance, trioxymethylene or methylal; in this case so much of the active-methylene containing substance as will furnish about from 1 to 2 atomic group weights of active methylene is used for every 2 molecular weights of the naphthalene sulfonic acid compound. As the products of condensation obtained in this way, are very liable to oxidation, heating must be avoided as much as possible.

The use of condensing agents in this example is also unnecessary. On the other hand, one is not necessarily limited to aqueous solutions, as the reaction takes place easily, if all the other conditions are complied with, in slightly acid solutions such for example as in a very dilute hydrochloric acid solution.

The condensation products from the 1.7- and 1.8-amino-naphthalene-monosulfonic acids, as well as those from the 2.5-, 2.6- and 2.7- and 2.8-amino-naphthalene-monosulfonic acid can be manufactured in the same way, the solutions of amino-naphthalene-sulfonic acids being used in such concentration as is permitted by the solubility in water of the salts used.

1-aminonaphthalene-7-monosulfonic acid gives a bright gray amorphous condensation product easily soluble in water; an aqueous solution of this product is colored blue by ferric chlorid.

The condensation product from 1-amino-naphthalene 8-monosulfonic acid separates, on being strongly acidified with acetic acid in the form of a grayish-white jelly-like precipitate which is difficultly soluble in cold water, and easily soluble in hot water. The solution gives a dirty violet coloration with ferric chlorid. The condensation product from 2-amino-naphthalene-5-monosulfonic acid is precipitated by strong hydrocloric acid in the form of a green jelly-like precipitate easily soluble in water. On the addition of ferric chlorid to the aqueous solution, a milkiness is at once produced.

The condensation product from 2-aminonaphthalene-6-monosulfonic acid is also precipitated by concentrated hydrochloric acid in a jelly-like condition having a greenish color. The precipitate is difficultly soluble in cold water, more easily soluble in hot water and very easily soluble on the addition of sodium acetate. Ferric chlorid produces in the aqueous solution of the product a bright brown precipitate.

The 2-aminonaphthalene-7-monosulfonic acid also gives a jelly-like greenish condensation product soluble in hot water; in the solution of this product ferric chlorid produces a slight bright brown turbidity.

The condensation product from 2-aminonaphthalene 8-monosulfonic acid, partly separates, after the reaction is finished, in the form of an amorphous bright brown precipitate—the remainder can be easily completely separated by sodium chlorid. The product is soluble in cold water. A clear acid solution of the product is not changed by the addition of ferric chlorid.

The 1-aminonaphthalene- 5- monosulfonic acid condenses with formaldehyde a little more slowly compared to the other isomeric acids. The process when using this acid, is preferably modified by adding to the solution of the sodium salt prepared as above, the whole quantity of formaldehyde required and then slowly adding acetic acid at long intervals. The reaction is complete when a test portion on dilution and mixing with hydrochloric acid, no longer shows any precipitation of unchanged 1-aminonaphthalene-5-sulfonic acid. The condensation product is precipitated on addition of strong hydrochloric acid to the concentrated solution in the form of an almost white amorphous precipitate, easily soluble in water. With ferric chlorid its solution gives a brownish-violet but not very characteristic coloration.

It has been further found that condensation products obtained in accordance with the foregoing process from hetero-nucleal amino - naphthalene - monosulfonic acids ($NH_2 : SO_3H$ 1:5, 1:6, 1:7, 1:8, 2:5, 2:6, 2:7, 2:8) or their salts, can be converted into a new class of compounds by treating them under conditions otherwise the same with a further molecule of formaldehyde, so that altogether one molecule of aldehyde is used for 1 molecule of sulfonic acid. The substances thus obtained, also have the valuable property of precipitating glue from solutions of the same in the presence of acids.

Example 5.

5 parts by weight of 1-aminonaphthalene-6-monosulfonic acid and 1.2 parts by weight of anhydrous sodium carbonate are dissolved in 20 parts of water. To the cold solution a mixture of 0.84 part by weight of formaldehyde (40%) and 13.6 parts by weight of acetic acid (10%) is slowly added.

On the completion of the condensation, which can be recognized by the fact that from a test sample after dilution and acidification with weak hydrochloric acid, there is no longer precipitated any free aminonaphthalene - monosulfonic acid, a further 0.84 part by weight of formaldehyde (40%) are added to the solution which is then stirred for several hours. There then occurs a second condensation, which as with the first takes place at the ordinary temperature. The reddish color of the solution of the first condensation product from the 1-aminonaphthalene-6-sulfonic acid then changes to yellow. When the reaction is finished, ferric chlorid produces a green precipitate instead of a blue, coloration, and iron alum also produces a green coloration. The addition of sodium chlorid to the solution after acidification with hydrochloric acid causes the condensation product to separate in the form of a yellowish colored amorphous precipitate, which is easily soluble in hot water, and more easily still on the addition of sodium acetate thereto. Needless to say the reaction need not be stopped after the formation of the first condensation product but on the contrary, the formaldehyde mixture can be continuously introduced drop by drop until the complete formation of the second condensation product. The addition of the formaldehyde is effected either quicker or slower according to the various acids that are employed.

When using 1-aminonaphthalene-7-sulfonic acid, the solution which, after the first condensation (concentration 1:20) is almost as clear as water on the addition of the second molecule of formaldehyde assumes a brownish yellow color. Hydrochloric acid separates the condensation product in the form of a yellowish precipitate easily soluble in hot water. The solution gives with ferric chlorid a green precipitate, and with iron alum a green coloration.

The first condensation product from 1-aminonaphthalene-8-sulfonic acid can be precipitated with acetic acid from a solution (concentration 1:60), in the form of a grayish-white precipitate difficultly soluble in cold water, while the second condensation product can be separated by hydrochloric acid, but not by acetic acid, in the form of a brownish red amorphorus precipitate. With ferric chlorid, the solution of the first condensation product assumes a violet color, and that of the second gives a dirty green turbidity.

The bright yellow solution of the first condensation product from 1-aminonaphthalene-5-sulfonic acid (concentration 1:30) assumes a deep yellow color on the addition of the second molecule of formaldehyde. Hydrochloric acid precipitates a bright yellow precipitate soluble in water, the solution of which is not affected in color by ferric chlorid.

The condensation product from 2-aminonaphthalene-5-sulfonic acid (concentration 1:50) separates after the second condensation in the form of a white amorphous precipitate, difficultly soluble in water. An aqueous solution of the new product gives with ferric chlorid a deep yellow precipitate, but is unchanged by the addition of iron alum.

The second condensation product from 2-amino-naphthalene-6-sulfonic acid (concentration 1:60) is precipitated by concentrated hydrochloric acid in the form of a bright green amorphous precipitate soluble in water. Its aqueous solution gives a reddish-brown precipitate with ferric chlorid.

With the 2-aminonaphthalene-7-sulfonic acid the color of the solution (concentration 1:60) changes from green (after the first condensation) to yellow (after the second condensation). The condensation product precipitated by hydrochloric acid is a yellowish-white amorphous precipitate soluble in water; the addition to a solution of this precipitate of ferric chlorid produces a deep brown precipitate.

The first condensation product from 2-amino-naphthalene-8-sulfonic acid (concentration 1:30) forms a clear yellowish solution which, after the addition of the second molecule of formaldehyde and after standing for a time, solidifies to a reddish-brown jelly difficultly soluble in water. On being mixed with ferric chlorid, the solution of the first condensation product remains clear, while a yellow-brown precipitate is produced in the second.

In carrying into practice the various processes, it is of course unnecessary always to adhere strictly to the proportions mentioned in the examples (1 or 2 molecules of formaldehyde to 2 molecules of acid). On the contrary, the most favorable conditions as regards proportions to be used, temperature, etc. for each individual case remain to be ascertained by experiment. As both the first and the second condensation products possess the properties of tanning, it may be desirable in some cases to carry out the process so as to obtain mixed products. In certain cases, it is also possible to start from a mixture of sulfonic acids.

The condensation products prepared in accordance with this invention, represent in the form of solutions valuable tanning substances, which can be used either alone or in combination with other tanning substances, as for instance those of a vegetable nature.

For manufacturing a tanning liquor the condensation product is dissolved in water. In order to avoid excessive swelling of the hairless skins occurring later on, preferably as much alkali is added as is required to bring the solution nearly to its neutralization point. A portion of the solution is diluted and used as a tanning liquor at a concentration of about 3° Bé. During the tanning process, the liquor is improved by gradual addition of the above mentioned stronger liquor, and if necessary, of acid, so that gradually a liquor of 5° Bé. is obtained, with which the tanning process is completed. The tanning is effected in the usual manner by suspending, introducing or moving the skins through an aqueous solution of the products. The leather obtained is subjected to further treatment in the well known manner. In certain circumstances, the isolation of the condensation products formed need not be carried out, and the tanning liquor can be manufactured directly by diluting the reaction mixture.

I claim:—

1. A process of making glue-precipitating substances which comprises condensing an active methylene-containing substance with a naphthalene sulfonic acid containing a substituent increasing the reactivity of the naphthalene nucleus in a non-alkaline solution containing a large proportion of water.

2. A process of making glue-precipitating substances which comprises condensing an active methylene-containing substance with a naphthalene sulfonic acid containing a substituent increasing the reactivity of the naphthalene nucleus in a dilute solution of another acid.

3. The process of making glue-precipitating substances which comprises condensing an active methylene-containing substance with an oxy-naphthalene sulfonic acid in a non-alkaline solution containing a large proportion of water.

4. A process of making glue precipitating substances which comprises condensing formaldehyde with an oxy-naphthalene monosulfonic acid in a non-alkaline solution containing a large proportion of water.

5. A process of making glue-precipitating substances which comprises condensing an active methylene-containing substance with a naphthalene sulfonic acid containing a substituent increasing the reactivity of the naphthalene nucleus in the proportions of 2 molecular weights of the naphthalene sulfonic acid to so much of the active methylene containing substance as will furnish about from 1 to 2 atomic group weights of active methylene.

6. A process of making glue-precipitating substances which comprises condensing an active methylene-containing substance with a naphthalene sulfonic acid containing a substituent increasing the reactivity of the naphthalene nucleus in the proportions of 2 molecular weights of the naphthalene sulfonic acid to so much of the active methylene containing substance as will furnish about from 1 to 2 atomic group weights of active methylene in the presence of a large proportion of water.

7. A process of making glue precipitating substances which comprises condensing formaldehyde with an oxy-naphthalene monosulfonic acid in the proportions of two molecules of the latter to about from 1 to 2 molecules of the former.

8. A process of making glue precipitating substances which comprises condensing formaldehyde with an oxy-naphthalene monosulfonic acid in the proportions of two molecules of the latter to about from 1 to 2 molecules of the former in a solution containing a large proportion of water.

9. A process of making glue precipitating substances which comprises condensing at normal temperature formaldehyde with an oxy-naphthalene monosulfonic acid in the proportions of 2 molecules of the latter to about from 1 to 2 molecules of the former.

10. A process of making glue precipitating substances which comprises condensing formaldehyde with an oxy-naphthalene monosulfonic acid in the proportions of 2 molecules of the latter to about 2 molecules of the former.

11. A process of making glue-precipitating substances which comprises condensing, in a dilute acid solution, formaldehyde with a naphthalene sulfonic acid containing in the unsulfonated benzene nucleus a substituent increasing the reactivity of the naphthalene nucleus.

12. A process of making glue-precipitating substances which comprises condensing formaldehyde with 2-oxynaphthalene-6-sulfonic acid in a solution containing a large proportion of water.

13. A process of making glue-precipitating substances which comprises condensing formaldehyde with 2-oxynaphthalene-6-sulfonic acid in the proportion of two molecules of the latter to about one molecule of the former in a solution containing a large proportion of water.

14. A process of making glue-precipitating substances which comprises condensing, in a dilute acid solution, formaldehyde with 2-oxynaphthalene-6-sulfonic acid in the proportion of two molecules of the latter to about one molecule of the former.

15. A new composition of matter comprising a substituted naphthalene sulfonic acid-formaldehyde condensation product, containing a substituent increasing the reactivity of the naphthalene nucleus and containing not more organically bound sulfur than the initial materials and having glue-precipitating properties.

16. A new composition of matter comprising an oxy-naphthalene monosulfonic acid-formaldehyde condensation product, containing not more organically bound sulfur than the oxy-naphthalene-sulfonic acid employed and having glue-precipitating properties.

17. A new composition of matter comprising a condensation product, in aqueous solution, of formaldehyde and a substituted naphthalene sulfonic acid containing a substituent increasing the reactivity of the naphthalene nucleus obtainable by condensing two molecules of the latter with from 1 to 2 molecules of the former.

18. A new composition of matter comprising a condensation product, in aqueous solution, of formaldehyde and an oxy-naphthalene monosulfonic acid obtainable by condensing two molecules of the latter with from 1 to 2 molecules of the former.

19. A new tanning composition comprising a dilute aqueous solution of a condensation product of a substituted naphthalene sulfonic acid containing a substituent increasing the reactivity of the naphthalene nucleus and an active methylene-containing substance.

20. A new tanning composition comprising a dilute aqueous solution of an oxy-naphthalene monosulfonic acid formaldehyde condensation product.

21. A new tanning composition comprising a dilute aqueous solution of an oxy-naphthalene monosulfonic acid-formaldehyde condensation product containing not more organically bound sulfur than the oxy-naphthalene-sulfonic acid employed.

22. A new tanning composition comprising an aqueous solution of a naphthalene sulfonic acid-formaldehyde condensation product containing a substituent increasing the reactivity of the naphthalene nucleus having a concentration of about from 3 to 5° Bé.

23. A new tanning composition comprising an aqueous solution of an oxy-naphthalene sulfonic acid-formaldehyde condensation product having a concentration of about from 3 to 5° Bé.

24. A new composition of matter comprising a 2-oxynaphthalene-6-sulfonic acid-formaldehyde condensation product, said product being practically colorless in the pure state and in the form of the free acid soluble in less than 10 parts of water, containing no additional organically bound sulfur and having glue-precipitating properties.

25. A new composition of matter comprising a condensation product, of formaldehyde and 2-oxy-naphthalene-6-sulfonic acid obtainable by condensing two molecules of the latter with one molecule of the former in an aqueous solution, said condensation product being practically colorless in the pure state and in the form of the free acid soluble in less than 10 parts of water, containing no additional organically bound sulfur and having glue-precipitating properties.

In testimony whereof I have signed my name to this specification in the presence of two subscribing witnesses.

Dr. ADOLF RÖMER.

Witnesses:
   CRIDA F. CAIBER,
   ROSA THALBAUER.